April 29, 1947. C. R. MOLINE Re. 22,874

BRAKE HEAD RETAINING MECHANISM FOR BRAKE BEAMS

Original Filed May 2, 1944

INVENTOR.
Carl R. Moline
BY
Mann, Brown & Co.
ATTYS.

Reissued Apr. 29, 1947

Re. 22,874

UNITED STATES PATENT OFFICE 22,874

BRAKE HEAD RETAINING MECHANISM FOR BRAKE BEAMS

Carl R. Moline, Homewood, Ill., assignor to Allied Railway Equipment Company, a corporation of Illinois Original No. 2,391,329, dated December 18, 1945, Serial No. 533,695, May 2, 1944. Application for reissue June 5, 1946, Serial No. 674,418

10 Claims. (Cl. 188—226)

This invention relates to railway brakes and more particularly to a break beam assembly for railway trucks.

The principal object of the invention is the provision of means for preventing the tension and compression members of a trussed brake beam from becoming disassembled even though the nuts or other securing means at the ends of the tension member become ineffective for any reason.

Another object of the invention is the provision of a new and improved mechanism for holding the compression member and truss rod of a railway truck brake beam assembly in assembled relation.

A further object of the invention is the provision of a new and improved safety appliance for railway truck brake beams that is simple in construction, inexpensive to manufacture, easily assembled, efficient in use and that is not likely to become broken or get out of order.

Figure 1:
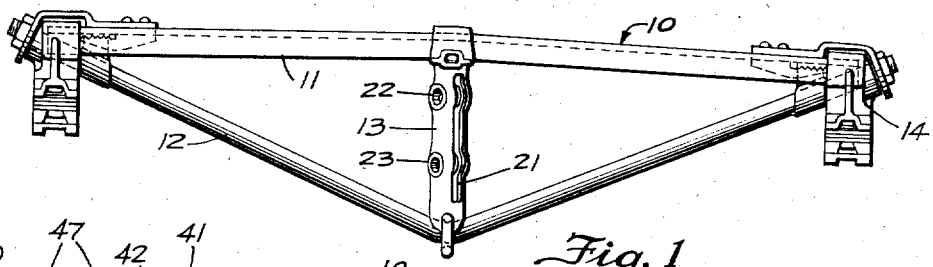
Figure 2:
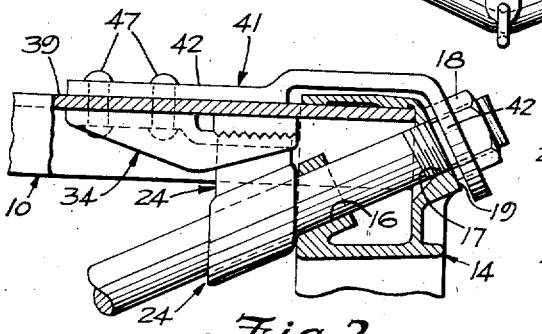
Figure 3:
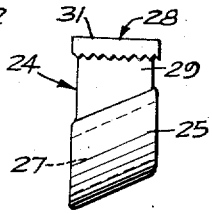
Figure 4:
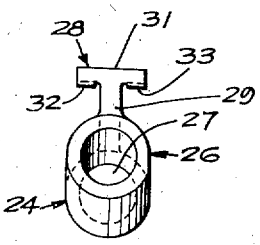
Figure 6:
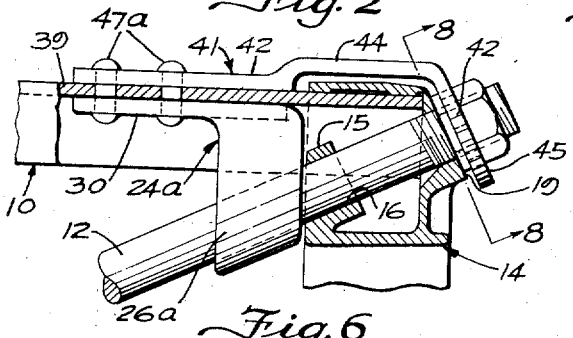
Figure 5:
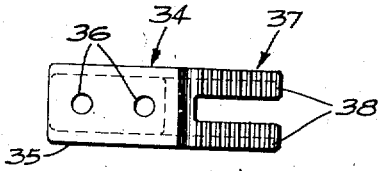
Figure 7:
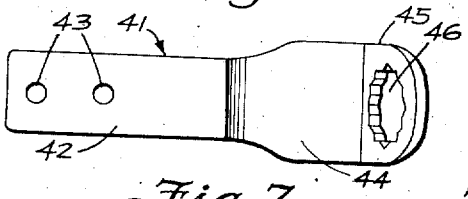
Figure 8:
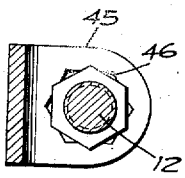
Figure 10:
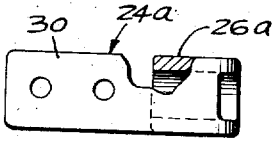
Figure 9:
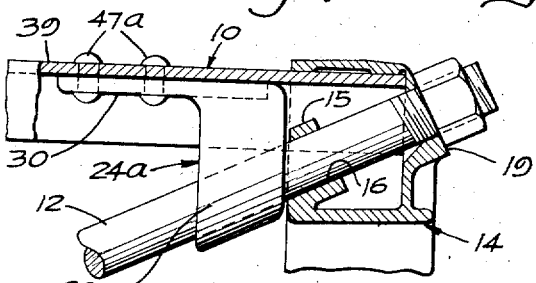

Other and further objects and advantages of the invention will appear from the following description taken in connection with the accompanying drawing, in which Figure 1 is a plan view of a brake beam showing the invention in position thereon, Fig. 2 is an enlarged view of one end of the brake beam with parts in section and parts broken away and showing the invention in position on the brake beam, Fig. 3 is a plan view of the sleeve head retaining member, Fig. 4 is an end elevation of the construction shown in Figure 3, Fig. 5 is an elevation of the anchor for the sleeve head retaining member, Fig. 6 is a view similar to Figure 2 but showing a modified form of construction, Fig. 7 is an elevation of the nut lock and sleeve head retaining member, Fig. 8 is a section on the line 8—8 of Figure 6, Fig. 9 is a view similar to Figure 6 but omitting the nut lock and sleeve head retaining member, and Fig. 10 is a side elevation of the sleeve head retaining member shown in Figures 6 and 9 with parts in section and parts broken away.

It is not unknown in the operation of railway trucks for the nuts at the ends of the tension member or truss of railway brake beams to become detached either by accidentally becoming unscrewed or the ends of the rods broken off.

Serious accidents have occurred because either the nut on one end or the other of a tension member of a brake beam becomes unscrewed and lost, or because, in some instances, the ends of the tension member adjacent to the nut and inwardly thereof break off. When either of these contingencies occurs, the sleeve head at that end of the brake beam gradually works off the ends of the brake beam and the beam becomes disassembled.

Since the compression and tension members at the ends of the beam extend convergently through the sleeve heads, it is necessary that these members gradually spread apart as the head slides outwardly before becoming detached. The present invention provides means for preventing spreading of the outer ends of these members, and, as a result, the heads cannot move outwardly on the ends of the brake beam. Means are also provided for preventing the turning of the nuts that hold the sleeve heads on the ends of the brake beam and simultaneously engage the outer ends of these sleeve heads for holding the parts in assembled relation.

Referring now to the drawing, the reference character 10 designates the conventional brake beam for use on a railway truck which is of the usual or any well-known construction and comprises a compression member 11, a tension member 12 and a strut or fulcrum member 13 which is attached to the central portion of the compression member and engages the intermediate portion of the strut or tension member. The end portions of the tension member are bent toward the compression member and are secured thereto by sleeve heads 14 which slidably engage both of said members at the ends of the brake beam. The compression member 10 is in the form of a channel bar opening toward the tension member and each sleeve head is provided with an extension 15 which enters between the flanges of the compression member and is provided with a diagonal opening 16 through which the threaded end of the tension member 12 is adapted to extend. The sleeve head 14 is provided with a second opening 17 in alignment with the opening 16 through which the end of the tension member extends. The ends of the tension member are threaded and nuts 18 thereon engage flat surfaces 19 on the sleeve heads for holding said heads on the ends of the compression member. The brake beam strut is provided with the usual slot 21 and openings 22 and 23 whereby the brake lever may be attached in the usual manner. Since the construction thus far described is the conventional type of brake beam, it is not thought necessary to further illustrate or describe the same.

From an inspection of the drawing, it will be seen that in order to remove the sleeve heads 14 from the brake beam, it is necessary to remove the nuts and slide the heads laterally and simultaneously spread the tension and compression members apart. In other words, if these two members be prevented from spreading apart, the brake beam will remain in assembled relation. Suitable means are provided for preventing the spreading of these members at their ends, and by doing so this means will hold the parts in working condition, even though the nuts become accidentally unscrewed or the outer ends of the tension member broken off.

In the form of construction shown in Figs. 1, 2, 3 and 4, a sleeve head retaining device or member 24 is employed for retaining the parts in assembled relation. This retaining device comprises a body portion 26, provided with an opening 27 extending diagonally therethrough. Extending laterally from the body portion 26 is a T-shaped extension 28, comprising a flat stem portion 29 in the plane of the axis of the opening 27 and a cross member 31. The cross member 31 has teeth or serrations 32 and 33, Fig. 4, at opposite sides of the stem portion 29. A suitable anchor or attaching member 34 is provided for adjustably anchoring or attaching the sleeve head retaining device 24 in fixed position on the outer end of the tension and compression members.

The anchor member 34 comprises a flat body portion 35, having attaching openings 36 therein. Extending outwardly from the body portion 34, and offset laterally therefrom, is a bifurcated extension 37, having serrations or teeth 38 on its inner side which are adapted to engage the corresponding teeth 32 and 33 on the member 31. The anchor member 34 is rigidly attached to the web 39 of the compression member 11. Preferably the sleeve head retaining device 24 is adjusted so that its outer side will be in close proximity to the inner side of the sleeve head, as shown more clearly in Fig. 2 of the drawing. It will thus be seen that when the parts just described are in assembled position, the outer ends of the tension and compression members will be held from spreading apart, and, since the sleeve head 14 cannot be removed unless these members are spread apart, the parts will be held in assembled position. If desired, suitable means may be provided for preventing the nuts 18 from turning on the outer threaded ends of the tension member and for assisting in holding the sleeve heads on the ends of the brake beam.

In the form of construction selected to illustrate one embodiment of the invention, a safeguard in the form of a nut lock and sleeve head retaining device 41 is employed for this purpose. This device comprises a flat shank or body portion 42 having openings 43 extending transversely therethrough. The outer end portion of the device 41 is offset laterally from the compression member, as shown at 44, to provide a clearance for the sleeve head and has its outer end 45 bent parallel with and adjacent the face 19, as shown particularly in Figures 2 and 6. The end 42 is provided with an angular opening 46, the one shown having twelve angles within which the nut 18, which is shown as being hexagonal, extends whereby fine adjustments may be made and the nut held from turning in either direction.

The nut lock and sleeve head retaining device 41 is also rigidly secured to the compression member, and, in the construction shown in Figure 2, this member and the anchor member 34 are rigidly secured to the web of the channel bar forming the compression member as by means of rivets 47 which extend therethrough, as shown more particularly in this figure.

It will be noted that members 24 and 41 cooperate to prevent the accidental removal of the sleeve heads and that even though the tension member be broken off at the inner side of the nut 18 that the downwardly extending portion 42 of the member 41 will assist in preventing the accidental removal of the sleeve head while the sleeve head retaining member 24 will prevent spreading of the tension and compression members of the brake beam. The cooperating teeth on the members 34 and 24 permit ready adjustment of the member 24 in attaching the same to the brake beam. In other words, it is not necessary to be accurate as to the positions of the openings through the parts for the rivet 47 in assembling the device.

In the construction shown in Figure 6 no adjustment is provided for attaching the head retaining member **24*a* to the compression member, and, in this construction, the head retaining member 24*a* comprises a body portion 26*a* having a diagonal opening therethrough similar to that already described. The body portion 26*a* is provided with a lateral flat extension 30 which is adapted to engage the web 39 of the compression member and is apertured for receiving attaching means. A nut lock and sleeve head retaining member 41, similar to the one already described, is provided and the extension 30 and the member 41 are rigidly secured to the web portion 39, as by means of rivets 47*a* which extend through aligned openings through these members and through the web 39**. After the parts in Figure 6 have been assembled, they will function substantially the same as that shown in Figure 2.

Fig. 9 differs from the construction shown in Fig. 6 only in the fact that the parts are held in assembled relation solely by the head retaining member **24*a*. In other words, the nut lock and sleeve head retaining member 41 is dispensed with in this form of construction. If desired, the head retaining device 24 or 24*a*, with or without the sleeve head retaining members 41, may be secured in position by bolts and nuts, instead of by rivets 47 or 47*a***, as shown in the drawing.

It is thought from the foregoing, taken in connection with the accompanying drawing, that the construction and operation of my device will be apparent to those skilled in the art, and that changes in size, shape, proportion or detail may be made without departing from the spirit and scope of the appended claims.

I claim:

1. In a brake beam, compression and tension members, a strut between the intermediate portions of said members, sleeve heads engaging the outer ends of said members, sleeve head retaining members for holding said sleeve heads in position on the ends of the brake beam, said last named members each comprising a body portion having an opening extending diagonally therethrough and having a laterally extending serrated attaching portion, an anchor member having bifurcations extending to opposite sides of said attaching portion and having serrations adjustably engaging the serrations on said attaching portion, and means for rigidly connecting said anchor member to said compression member.

2. In a brake beam, compression and tension members, a strut between the intermediate portions of said members, sleeve heads engaging the outer ends of said members, each of said sleeve heads providing a path of withdrawal therefrom for said tension member diverging with respect to said compression member thereby requiring lateral movement of the tension member relative to the compression member for separation of the tension member from the assembled sleeve head, means inwardly of said sleeve heads for preventing such lateral movement of said two members relative to each other as will permit disengagement of said heads from said members, means on each of the outer ends of one of said members to block movement of the corresponding sleeve head out of engagement with said one member, and means mounted on one of said two members inwardly of each of said sleeve heads and overhanging the outer sides of the sleeve heads to block outward movement of the sleeve heads relative to said other member.

3. In a brake beam, compression and tension members, a strut between the intermediate portions of said members, said members converging towards the end of the brake beam, sleeve heads engaging the outer ends of said members, nuts on the outer ends of said tension members, sleeve head retaining means immediately adjacent the inner side of each of said sleeve heads, said sleeve head retaining means interconnecting said two members to prevent lateral relative movement therebetween, and a combined nut lock and sleeve head retaining means extending across each of said sleeve heads from the inner side of the sleeve head to the outer side thereof, said combined means engaging the corresponding nut on the outer side of the sleeve head to prevent rotation thereof.

4. In a brake beam, compression and tension members, a strut between the intermediate portions of said members, said members converging toward the end of the brake beam, sleeve heads engaging the outer ends of said members, nuts on the outer ends of said tension members to prevent disengagement of said sleeve heads, sleeve head retaining means immediately adjacent the inner side of each of said sleeve heads, said retaining means interconnecting said two members to prevent lateral relative movement therebetween, a combined nut lock and sleeve head retaining means extending across each of said sleeve heads from the inner side of the sleeve head to the outer side thereof as additional means to prevent disengagement of the sleeve head, and fastening means at each end of the brake beam common to both the corresponding retaining means and the corresponding combined means, said fastening means extending through the material of said compression member inwardly of the corresponding sleeve head.

5. In a brake beam, a compression member of hollow non-circular configuration, a tension member, a strut between the intermediate portions of said members, said members converging towards the end of the brake beam, a sleeve head on each end of said beam having an integral portion embracing the corresponding end of said compression member, said sleeve head having an aperture receiving the end of said tension member, means on the outer end of said tension member in abutment with the outer face of the corresponding sleeve head, and safeguard means mounted on said compression member on the inner side of each of said sleeve heads, said safeguard means extending across the sleeve head and overhanging the outer face of the sleeve head to prevent disengagement of the sleeve head from said members.

6. A safeguard for a railway brake beam of the truss type having compression and tension members inserted in the converging openings of a sleeve head at each end of the beam with nuts on the outer ends of the tension members, said safeguard having a portion for anchorage on the end of said beam, and a portion to engage the corresponding nut on said tension member in a position to block removal of said sleeve head in the absence of the nut.

7. A safeguard for a railway brake beam of the truss type having compression and tension members inserted in the converging openings of a sleeve head at each end of the beam with nuts on the outer ends of the tension members, said safeguard having a base portion for mounting on one of said members and a portion at an angle to said base portion, said angled portion having a non-circular opening therethrough for locking engagement with the periphery of said nut.

8. A safeguard for a railway brake beam of the truss type having compression and tension members inserted in the converging openings of a sleeve head at each end of the beam with nuts on the outer ends of the tension members, said safeguard being adapted for attachment to said compression member on the inner side of the corresponding sleeve head and being shaped and dimensioned to extend across said sleeve head to the outer side of the sleeve head thereby to block outward movement of the sleeve head relative to said compression member in the absence of the corresponding nut.

9. In a brake beam, a compression member channel-shaped in general configuration with a central web and two side walls, a tension member, a strut between the intermediate portions of said members, a sleeve head on each end of said beam having an integral portion embracing the corresponding end of said compression member, each of said sleeve heads providing a path of withdrawal therefrom for said tension member diverging with respect to said compression member thereby requiring lateral movement of the tension member relative to the compression member for separation of the tension member from the assembled sleeve head, tensioning means on the outer end of said tension member in abutment with the outer face of the corresponding sleeve head, and a rigid, one-piece device substantially housed within the compression member and secured thereto within each end portion thereof, and having a part projecting laterally from the compression member and substantially surrounding the adjacent portion of the tension member and holding said members against relative lateral movement, thereby retaining the head on the beam irrespective of the tensioning means.

10. In a truss type brake beam, a compression member and a tension member, the end portions of said members convering towards the ends of the beam and each end portion of the compression member having a flat seat facing the tension member, a brake head receiving the end portions of said members and seated against the end and the back of the compression member, tensioning means on the end of the tension member seated against the outer side of the head, the head having a sleeve inclined to the length of the compression member and spaced inwardly from said side and receiving the tension member, a device adjacent the inner side of each head for holding said members against relative lateral movement and thereby retaining the head on the beam irrespective of the presence of the tensioning means, each of said devices comprising a one-piece body portion substantially encircling the tension member and a flat portion engaged with the adjacent seat on the compression member, and means securing said flat portion to said seat.

CARL R. MOLINE.

REFERENCES CITED

The following references are of record in the file of this patent:

UNITED STATES PATENTS

| Number | Name | Date |
|---|---|---|
| 1,694,989 | Sleeman | Dec. 11, 1928 |
| 2,270,262 | Busse | Jan. 20, 1942 |
| 2,319,484 | Welp | May 18, 1943 |
| 528,238 | Robischung | Oct. 30, 1894 |